(12) United States Patent
Minegishi et al.

(10) Patent No.: US 6,918,572 B2
(45) Date of Patent: Jul. 19, 2005

(54) VALVE DRIVE UNIT AND SERIES THEREOF

(75) Inventors: Kiyoji Minegishi, Aichi (JP); Jun Tamenaga, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 29 days.

(21) Appl. No.: 10/401,037

(22) Filed: Mar. 28, 2003

(65) Prior Publication Data

US 2003/0230735 A1 Dec. 18, 2003

(30) Foreign Application Priority Data

Mar. 29, 2002 (JP) ........................................ 2002-095451

(51) Int. Cl.[7] ................................................ F16H 1/32
(52) U.S. Cl. ........................ 251/248; 137/269; 475/168; 475/179
(58) Field of Search ................................ 475/178, 179, 475/168, 162; 251/248; 137/269, 271

(56) References Cited

U.S. PATENT DOCUMENTS

| | | | | |
|---|---|---|---|---|
| 1,784,094 A | * | 12/1930 | Fletcher | ...................... 137/269 |
| 5,433,672 A | * | 7/1995 | Tanaka et al. | ............... 475/179 |
| 5,533,942 A | * | 7/1996 | Fukaya | ........................ 475/178 |
| 5,536,218 A | * | 7/1996 | Fukaya et al. | ............... 475/178 |
| 5,651,747 A | * | 7/1997 | Minegishi et al. | ........... 475/178 |
| 6,440,030 B1 | * | 8/2002 | Minegishi et al. | ........... 475/178 |

FOREIGN PATENT DOCUMENTS

| | | |
|---|---|---|
| JP | 3054540 | 4/2000 |
| JP | 2000-314456 | 11/2000 |

* cited by examiner

*Primary Examiner*—John Bastianelli
(74) *Attorney, Agent, or Firm*—Squire, Sanders & Dempsey L.L.P.

(57) ABSTRACT

A series of electric valve drive units is provided, which can set up rotational efficiency and anti-counter-rotating function of a valve. In a series of electric valve drive units which can drive a valve body via reduction gears, at least one gear mechanism of the reduction gears is provided with an eccentric wobbling inscribed gear type of a planetary gear mechanism which has an input shaft, an external gear eccentrically and wobbly rotating about the input shaft, an internal gear engaged with the external gear, and a carrier absorbing a wobbling ingredient of the external gear. At least two types of valve drive units are supplied, one of which places prime importance on the anti-counter-rotating function, and the other places prime importance on the rotational efficiency.

10 Claims, 6 Drawing Sheets

VALVE DRIVE UNIT AND SERIES THEREOF

BACKGROUND OF THE INVENTION

1. Field of the Invention

The present invention relates to a drive unit of a valve body such as a ball valve, a butterfly valve and the like, and particularly relates to a series (a product group) of valve drive units which can drive the valve body via reduction gears.

2. Description of the Prior Art

A valve unit having a ball valve, a butterfly valve, or the like is generally known. The valve unit is disposed in a pipe of building materials, a sewage drain, for example, to open and close a duct and to adjust the quantity of flow. To drive these valve units, various types of manual or electric valve drive units are suggested. Japanese Patent No. 3054540, for example, discloses a valve drive unit employing a worm gear mechanism which is the most commonly used. In addition to the drive unit with the worm gear mechanism, a drive unit with a simple planetary gear mechanism is suggested to realize space savings.

These drive units have to smoothly rotate the valve body during rotating operation, in order to properly adjust the quantity of fluid flowing through the duct. On the other hand, when the valve body is stopping, the drive units should have function of preventing reverse rotation of the valve body (anti-counter-rotating function), because the fluid flowing through the duct puts a heavy load on the valve body.

When the valve drive unit employs the worm gear mechanism, it is possible to have a high anti-counter-rotating effect because its structure effectively limits the reverse rotation. The drive unit, however, has low rotational efficiency during the rotating operation (especially at a start of rotation,) so that there is a problem that the drive unit needs high power consumption in a case where the drive unit is frequently actuated by a motor.

On the other hand, when employing the simple planetary gear mechanism, the drive unit has higher rotational efficiency as compared with that with the worm gear mechanism. However, there is another problem that the drive unit is weak against the load put on the valve body because of its structure easy to rotate in reverse.

SUMMARY OF THE INVENTION

The present invention is in view of the problems described above. An object of the present invention is to provide a valve drive unit and a series thereof, which can set up proper rotational efficiency and anti-counter-rotating function of the valve body in accordance with a use application, with realizing miniaturization and space savings of the driver units.

According to the present invention, a valve drive unit for driving a valve unit having a valve body comprises an input shaft, an external gear eccentrically and wobbly rotatable around the input shaft, an internal gear engaged with the external gear, and a carrier being able to absorb a wobbling ingredient of the external gear. One of the internal gear and the carrier can be fixed and the other can be coupled to the valve body. As to eccentric wobbling rotational resistance of the external gear, two types of the valve drive units are prepared, one type of which has a first resistance against reverse torque of the external gear from the valve body, and the other type of which has a second resistance being smaller than the first resistance. The above problems are solved by means of selecting one type of the valve drive units.

The present invention takes advantage of a characteristic of an eccentric wobbling inscribed gear type of a planetary gear mechanism, that is, "the planetary gear mechanism needs high torque at a start of rotation (startup efficiency is relatively low), but can rotate with low torque after the start (during rotation), namely, rotational efficiency is high."

In other words, the high torque is needed when the valve body starts rotating from a stop condition. Conversely, even if a certain level of load is put on the valve body, the drive unit can have high anti-counter-rotating effect due to strong holding power. Also the valve body can be rotated with the low torque after the startup of the valve body (during the rotation), so that it is possible to increase the rotational efficiency of the valve body and to decrease the power consumption of the motor.

Furthermore, structure of the valve drive unit can make difference in eccentric rotational resistance of the external gear, so that it is possible to provide a plurality of valve drive units, in which set up as to the rotational efficiency and the anti-counter-rotating function of the valve body in accordance with a use application is carried out by small design change.

The drive unit only with the simple planetary gear mechanism cannot have the proper anti-counter-rotating effect even if a certain level of rotational resistance is given thereon. If such the strong rotational resistance is given as to have the proper anti-counter-rotating effect, the rotational efficiency remarkably decreases.

The present invention brings about significant advantages when the present invention is developed with taking the form of a series (the form of a product group) of the valve drive units. To be more specific, in a series of valve drive units for driving a valve body via reduction gears, at least one of reduction mechanisms of the reduction gears is an eccentric wobbling inscribed gear type of planetary gear mechanism having an input shaft, an external gear eccentrically and wobbly rotating around the input shaft, an internal gear engaged with the external gear, and a carrier being able to absorb a wobbling ingredient of the external gear. One of the internal gear and the carrier is fixed, and the other is coupled to the valve body. At least two types of the valve drive units are provided, one type of which places prime importance on function of preventing reverse rotation, and the other of which places prime importance on rotational efficiency, by means of making difference in eccentric wobbling rotational resistance of the external gear.

The present invention does not concretely limit a way to make difference in the wobbling rotational resistance of the external gear, so various ways are applicable.

In order to easily make the difference in the eccentric wobbling rotational resistance of the external gear, the eccentric wobbling inscribed gear type of the planetary gear mechanism has an eccentric element to wobbly rotates the external gear and various sliding conditions are brought about in a sliding section between the eccentric element and the external gear. Alternatively, the carrier includes an inner pin which is fitted into an inner pinhole formed in the external gear with play to absorb the wobbling ingredient of the external gear, and various sliding conditions are brought about in a sliding section between the inner pinhole and the inner pin. Then, it is possible to adjust smoothness of rotation and the anti-counter-rotating function of the valve body.

To make the difference in the sliding conditions in "the sliding section between the eccentric element and the external gear" and "the sliding section between the inner pinhole and the inner pin", both the drive unit with a sliding acceleration member such as a bearing, an inner roller, or the like disposed in the sliding section, and the drive unit without it may be provided. Also when the sliding acceleration member is disposed in the sliding section, a type of the sliding acceleration member may be changed to make the difference in the sliding conditions. A coefficient of friction between materials sliding in the sliding section may be changed to make the difference in the sliding conditions.

If components, except for a component to make the difference in the eccentric wobbling rotational resistance of the external gear, are shared (used commonly) among the series of valve drive units, almost all components are practically shareable. Therefore, it is possible to reduce costs, a burden of stock and the like.

DETAILED DESCRIPTION OF THE PREFERRED EMBODIMENTS

An embodiment of the present invention will be hereinafter described with reference to the drawings.

FIG. 1A is a sectional side view of a motor-operated valve 700 in which an electric valve drive unit 500 in a series (a product group) of valve units according to the present invention is used for rotating a rotary valve 600 (a butterfly valve in this embodiment). FIG. 1B is a front view in the vicinity of a valve body 602 of the rotary valve 600.

The motor-operated valve 700 includes the electric valve drive unit 500 and the rotary valve 600.

The rotary valve 600, which mainly includes the valve body 602 and a valve shaft 604, is integrally secured to the electric valve drive unit 500 described later with a bolt 606 with bordering on a fixing surface F0. A dimension of the fixing surface F0 adheres to an ISO flange dimension so as to have compatibility with other rotary valves.

Figure 1:
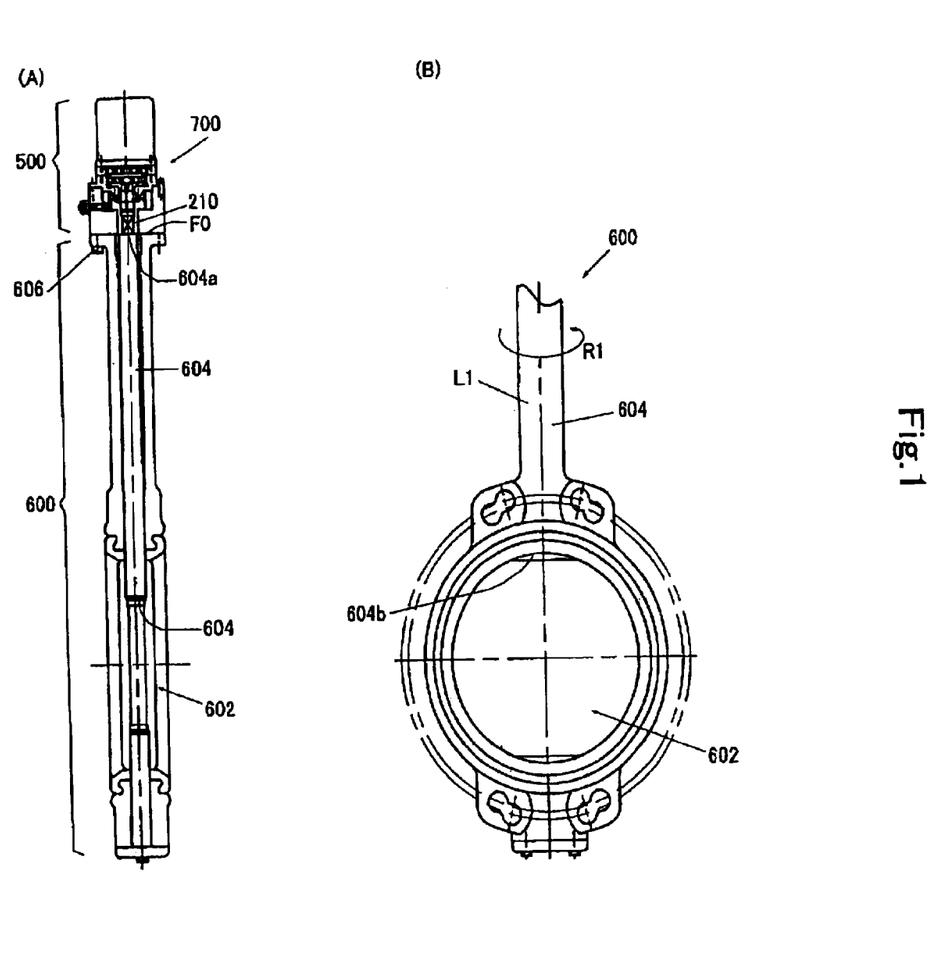
FIGS. 1A and 1B are diagrams showing a motor-operated valve which employs an electric valve drive unit in a series of valve units according to the present invention, FIG. 1A being a sectional side view thereof, FIG. 1B being a front view of a valve body.

Since one end 604a of the valve shaft 604 (an upper side in FIG. 1) is secured to an output shaft 210 of the electric valve drive unit 500, the valve shaft 604 is rotatable about a shaft center L1 in a direction of R1 with rotation of the output shaft 210.

The valve body 602 including a disc member is secured to the other end 604b (a lower side in FIG. 1) of the valve shaft 604. The valve body 602 is rotatable about the shaft center L1 with rotation of the valve shaft 604, and is used for open and close of a duct, adjustment of the quantity of flow and the like.

Figure 2:
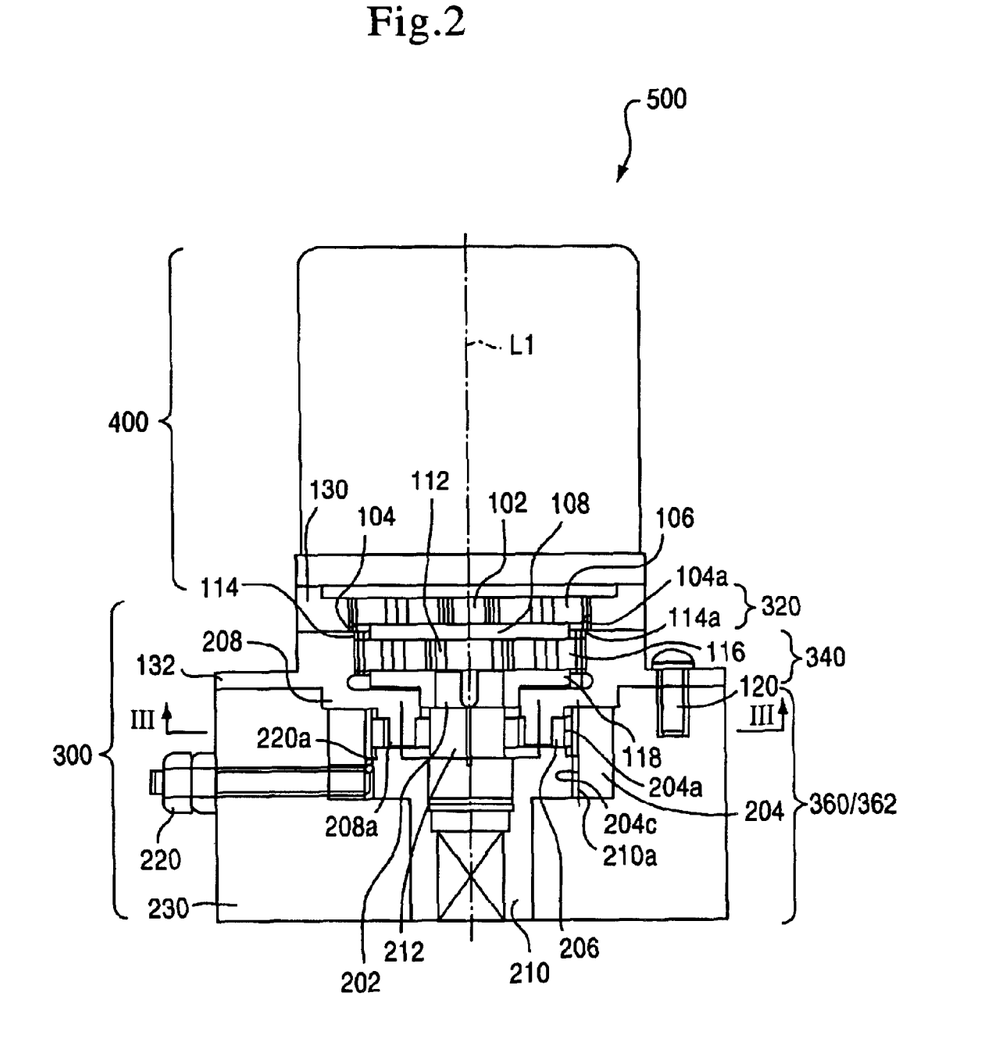
FIG. 2 is a sectional side view of the electric valve drive unit of FIG. 1.
Figure 3:
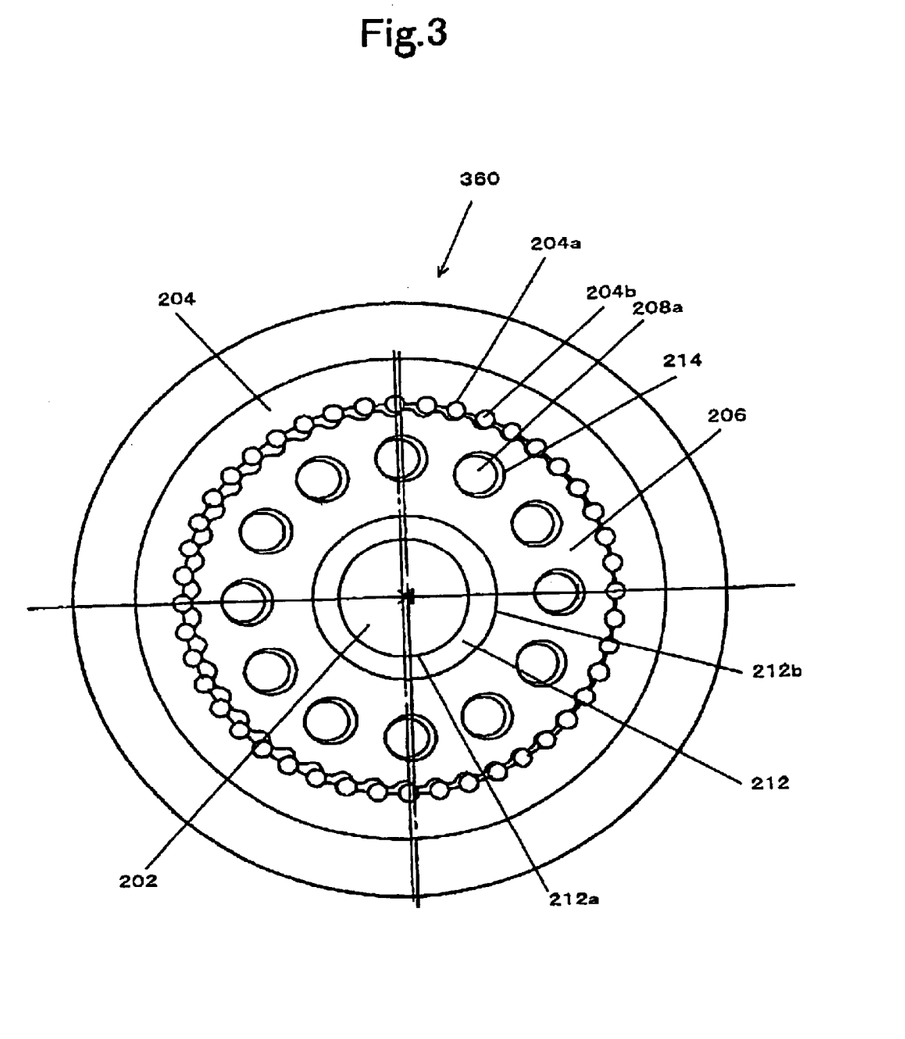
FIG. 3 is a cross sectional view taken along the line III—III in FIG. 2.

Structure of the electric valve drive unit 500 will be hereinafter described in detail with reference to FIGS. 2 and 3. FIG. 2 is a sectional side view of the electric valve drive unit 500, and FIG. 3 is a cross sectional view taken along the line III—III in FIG. 2.

The electric valve drive unit 500 is provided with a motor 400 and reduction gears 300. The motor 400 and the reduction gears 300 are integrally secured to each other with a bolt (not illustrated).

In this embodiment, the reduction gears 300 employs a three-gear reduction mechanism which includes a first reduction mechanism 320, a middle reduction mechanism 340, and a final reduction mechanism 360.

The first reduction mechanism 320 employs a so-called simple planetary gear mechanism which includes a first sun gear 102, a first planet gear 106 circumscribed around the first sun gear 102, a first internal gear 104 in which the first planet gear 106 is inscribed, and a first carrier 108.

The first sun gear 102 is connected to a motor shaft 101 of the motor 400 so as to transmit power, and is rotatable about the shaft center L1. A part of the first carrier 108 is inserted into the first planet gear 106 so that the first carrier 108 is in synchronization with revolution of the first planet gear 106 around the first sun gear 102. The first internal gear 104 fixed with the joint casing 130 with a bolt (not-illustrated) has internal gear tooth 104a on an inner side of the joint casing 130.

The middle reduction mechanism 340 employs a simple planetary gear mechanism, as in the case of the first reduction mechanism 320, which includes a second sun gear 112, a second planet gear 116 circumscribed around the second sun gear 112, a second internal gear 114 in which the second planet gear 116 is inscribed, and a second carrier 118.

The second sun gear 112 is connected to the first carrier 108 of the first reduction mechanism 320 so as to transmit power, and is rotatable about the same shaft center L1 as the first sun gear 102. A part of the second carrier 118 is inserted into the second planet gear 116 so that the second carrier 118 is in synchronization with revolution of the second planet gear 116 around the second sun gear 112. The second internal gear 114 fixed with a front casing 132 with a bolt (not-illustrated) has internal gear tooth 114a on an inner side of the front casing 132.

The final reduction mechanism 360 employs an eccentric wobbling inscribed gear type of a planetary gear mechanism (hereinafter called a wobbling inscribed planetary gear mechanism), which includes an input shaft 202, a third internal gear 204, an external gear 206, a third carrier 208, an output shaft 210, and an eccentric element 212.

The input shaft 202 can be connected to the second carrier 118 of the middle reduction mechanism 340, and can be rotatable about the same shaft center L1 as the second carrier 118.

The third internal gear 204, as shown in FIG. 3, has external pins 204b fitted in plural arc-shaped grooves 204a formed in an inner surface of a ring member. These pins 204b form internal gear tooth. An inner spline 204c is formed in a part of the inner periphery of the third internal gear 204.

The external gear 206, which has external gear tooth in a trochoid shaped, in an arc shaped or the like on an outer periphery thereof, is engaged with the external pins 204b of the third internal gear 204.

The third carrier 208 is integrally secured to the front casing 132 and is fixedly held. The third carrier 208 has inner pins 208a which are fitted with play into inner pinholes 214 formed in the external gear 206.

The eccentric element 212 having an eccentric outer periphery 212b to the shaft center L1 can integrally rotate with the input shaft 202. The eccentric element 212 wobbly rotates the external gear 206. In a case where resistance to rotate the external gear 206 in a reverse direction against reverse torque from the valve body 602 (the valve shaft 604 in concrete) shall be standard resistance α0, this structure has the first eccentric wobbling rotational resistance α1 of the external gear 206 which is larger than the standard resistance α0 (described later).

An outer spline 210a engaged with the inner spline 204c is formed in a part of an outer periphery of the output shaft 210. Accordingly, the output shaft 210 is integrally secured to the third internal gear 204, so the output shaft 210 and the third internal gear 204 can integrally rotate about the shaft center L1.

The reduction gears 300 are provided with a rotation limitation bolt 220 which penetrates through a valve side casing 230. An end 220a of the rotation limitation bolt 220 reaches the third internal gear 204.

Operation of the electric valve drive unit 500 will be hereinafter described.

When the motor 400 is energized, the first sun gear 102 of the first reduction mechanism 320 connected to the motor shaft 101 rotates about the shaft center L1. The first planet gear 106 engaged with the first sun gear 102 rotates with the rotation of the first sun gear 102. The first planet gear 106 is inscribed in the fixedly held first internal gear 104, so that the first planet gear 106 revolves around the shaft center L1 with the rotation on its axis. The revolution of the first planet gear 106 rotates the first carrier 108 a part of which is inserted into the first planet gear 106, and also rotates the second sun gear 112 of the middle reduction mechanism 340 secured to the first carrier 108.

As in the case of the first planet gear 106, the second planet gear 116 revolves with rotating on its axis by the rotation of the second sun gear 112. The revolution of the second planet gear 116 rotates the second carrier 118 a part of which is inserted into the second planet gear 116.

Then, the input shaft 202 of the final reduction mechanism 360 secured to the second carrier 118 rotates about the shaft center L1, and the eccentric element 212 provided in the input shaft 202 rotates. The rotation of the eccentric element 212 wobbly rotates the external gear 206 engaged with an eccentric outer periphery 212b of the eccentric element 212 about the input shaft 202. However, the third carrier 208 limits the rotation of the external gear 206, so that the external gear 206 just wobbles with being inscribed in the third internal gear 204.

Due to the wobble of the external gear 206, the internal gear 204 is rotated to rotate the output shaft 210 so that a speed reduction is carried out. It is considered that the third carrier 208 holds the external gear 206 with absorbing a wobbling ingredient of the external gear 206.

Ultimately, power transmitted to the output shaft 210 rotates the valve body 602 via the valve shaft 604 connected to the output shaft 210.

In order to insure movement of the valve body 602 for adjustment of the quantity of flow and the like, a rotational angle of the third internal gear 204 is limited (within 0 to 90 degrees in this embodiment) by the rotation limitation bolt 220.

Figure 4:
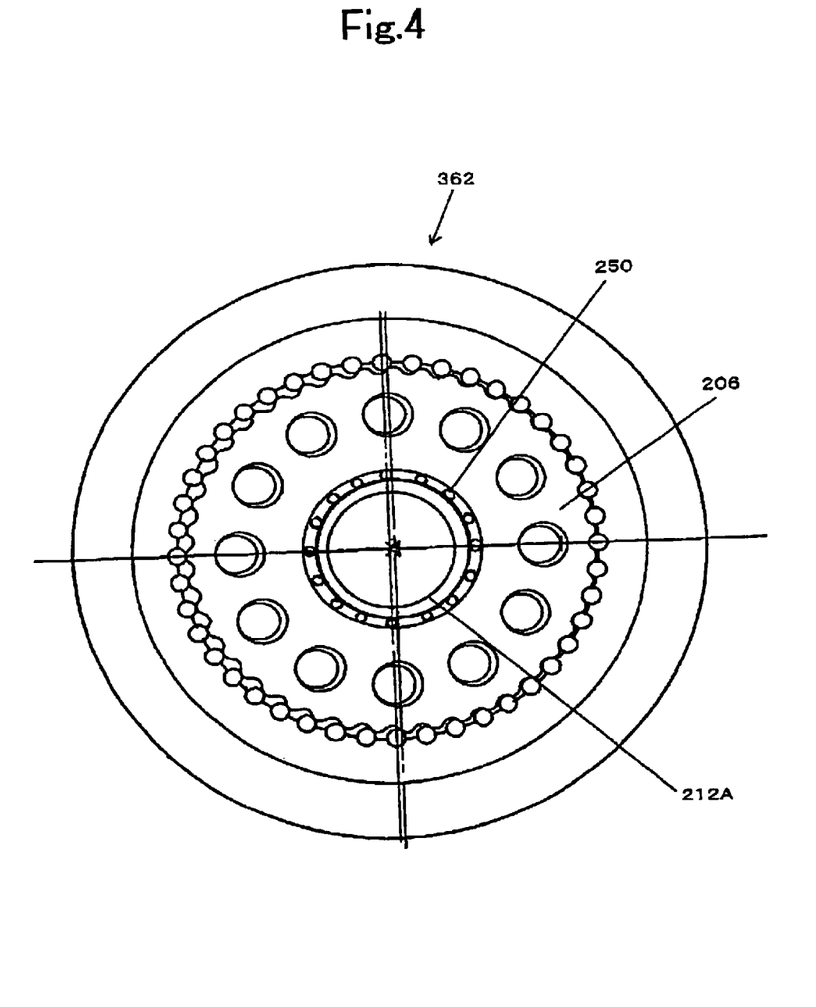
FIG. 4 is a sectional view of reduction gears of FIG. 2 in which a needle bearing is disposed in a sliding section between an eccentric element and an external gear.

FIG. 4 is a sectional view of a wobbling inscribed planetary gear mechanism 362 in which a needle bearing 250 is disposed in a sliding section between an eccentric element 212A and the external gear 206 as a sliding acceleration member. The outer periphery of the eccentric element 212A shares an inner ring of the needle bearing 250, and the inner periphery of the external gear 206 shares an outer ring thereof. In a case where resistance to rotate the external gear 206 in a reverse direction against reverse torque from the valve body 602 (the valve shaft 604 in concrete) shall be standard resistance α0, this structure has the second eccentric wobbling rotational resistance α2 of the external gear 206 which is smaller than the standard resistance α0. Namely, the second resistance α2 is smaller than the first resistance α1, and the standard resistance α0 lies between them. The reverse torque described above is torque (of fluid) expected to be usually exerted on the valve body 602.

As stated above, the wobbling inscribed planetary gear mechanism 362, in which the sliding acceleration member such as the needle bearing 250 or the like is disposed in the sliding section between the eccentric element 212A and the external gear 206, makes it possible to improve rotational efficiency. Also a sliding condition between the eccentric element 212A and the external gear 206 in this case is different from that in the wobbling inscribed planetary gear mechanism (the final reduction mechanism) 360 without the sliding acceleration member described above.

Accordingly, if a series (a product group) has two types of the electric valve drive units 500, one of which has the wobbling inscribed planetary gear mechanism 360 to place prime importance on function of preventing reverse rotation, and the other of which has the wobbling inscribed planetary gear mechanism 362 to place prime importance on rotational efficiency, it is possible to select the electric valve drive unit 500 in accordance with a use application as to the rotational efficiency and the anti-counter-rotating function of the valve body.

Figure 5:
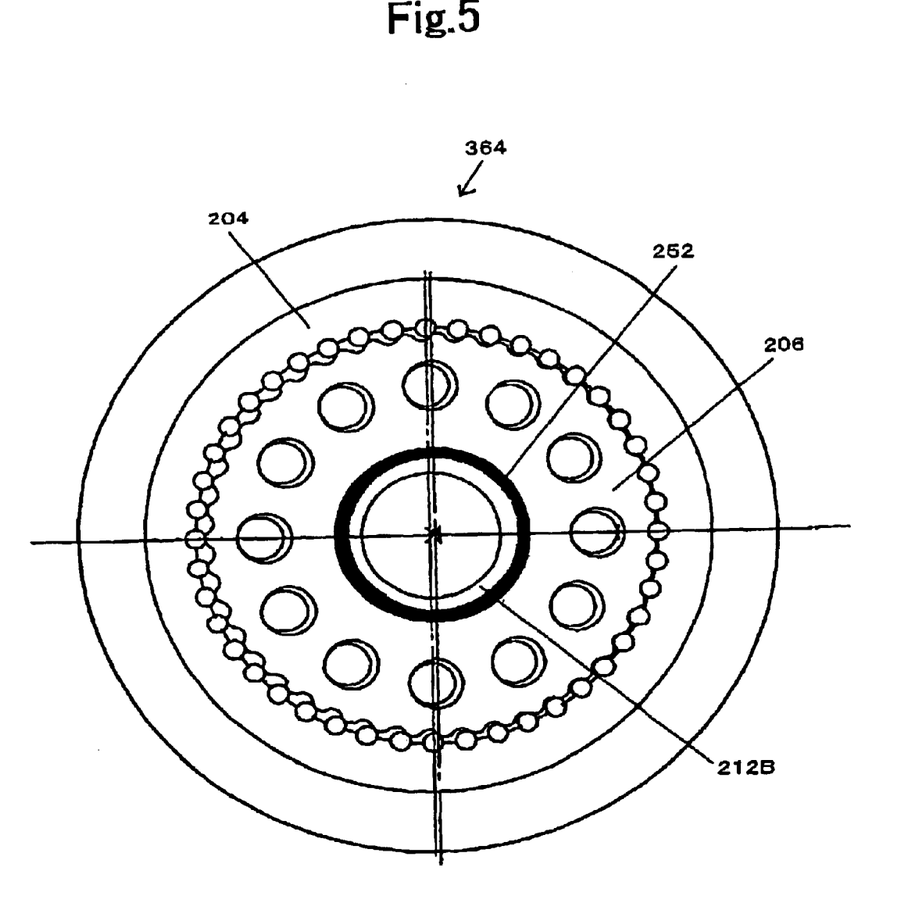
FIG. 5 is a sectional view of the reduction gears of FIG. 2 in which a bush is disposed in the sliding section between the eccentric element and the external gear.

As shown in FIG. 5, when a wobbling inscribed planetary gear mechanism 364, in which a bush 252 is disposed as a sliding acceleration member instead of the needle bearing 250, is employed in order to reduce a coefficient of friction, it is possible to make difference in the eccentric wobbling rotational resistance of the external gear 206. Therefore, if the electric valve drive unit 500 having the wobbling inscribed planetary gear mechanism 364 with the bush 252 provided as the sliding acceleration member is prepared in addition to the series of electric valve drive units 500 described above, it is possible to select suitable drive unit from among a plurality of electric valve drive units 500 which are variously set up in accordance with the use application as to the rotational efficiency and the anti-counter-rotating function of valve body. It is also possible to make difference in the eccentric wobbling rotational resistance by means of changing materials of the bush, among the wobbling inscribed planetary gear mechanisms with the bush 252, because a coefficient of friction differs.

Figure 6:
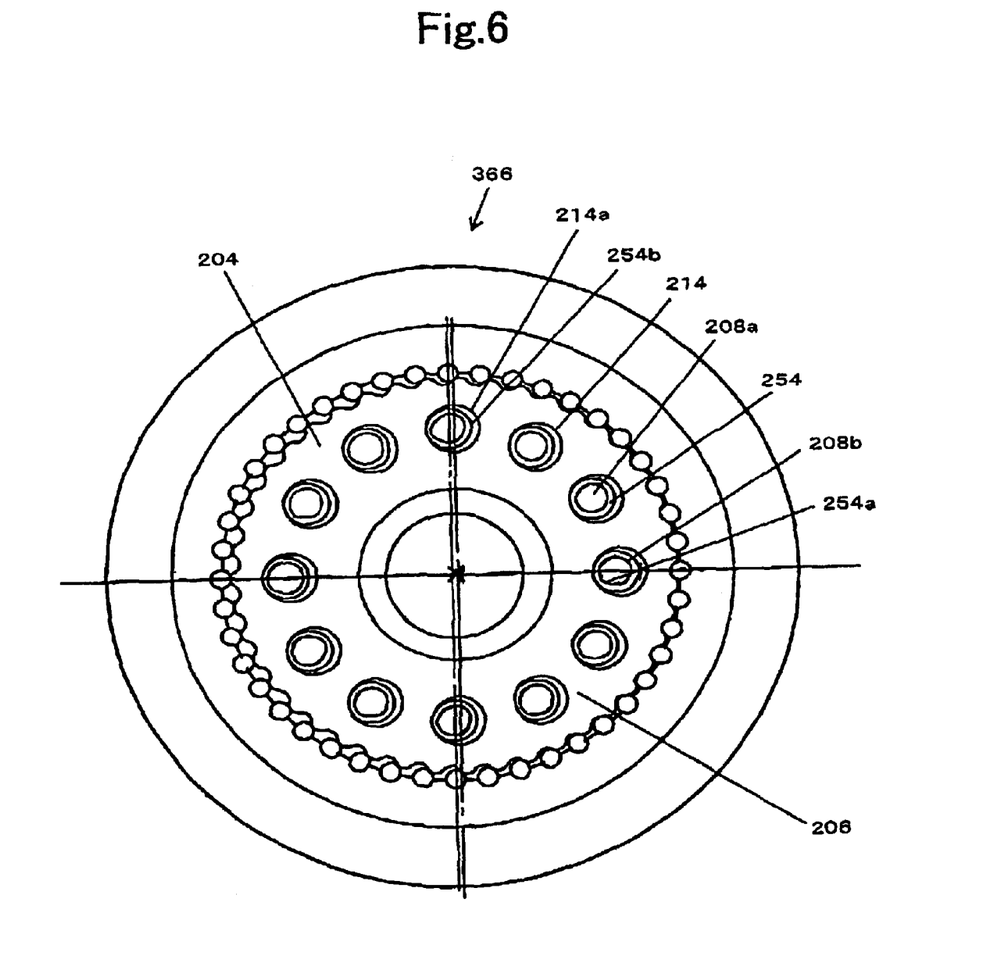
FIG. 6 is a sectional view of the reduction gears of FIG. 2 in which inner rollers are disposed in sliding sections between inner pins and inner pinholes.

Furthermore, as shown in FIG. 6, when employing a wobbling inscribed planetary gear mechanism 366 in which inner rollers 254 are disposed in the sliding section between the inner pins 208a and the inner pinholes 214 formed in the external gear 206 as a sliding acceleration member, the sliding condition between the inner pins 208a and the inner pinholes 214 is changed by the inner rollers 254, so that it is possible to make difference in the eccentric wobbling rotational resistance of the external gear 206.

As in the case of the bush 252, it is possible to make difference in the sliding condition in the sliding section, by means of change the coefficient of friction between an inner periphery 254a of the inner roller 254 and an outer periphery 208b of the inner pin 208a, or between an outer periphery 254b of the inner roller 254 and an inner periphery 214a of the inner pinhole 214. Thus, it is possible to make the difference in the eccentric wobbling rotational resistance of the external gear 206.

If components, except for a component to make the difference in the eccentric wobbling rotational resistance of the external gear 206, are shared (used commonly) among the series of electric valve drive units 500, it is possible to reduce costs and burden of stock. In this embodiment, as evidenced by the above description, it is possible to share the first reduction mechanism 320, the middle reduction mechanism 340, and almost all components of the final reduction mechanism 360 (the valve side casing 230, the third internal gear 204, the third carrier 208, the input shaft 202, the output shaft 210, and the like).

In the above embodiment, the rotary valve 600 is the butterfly valve, but the present invention is not limited thereto, so the valve may be a ball valve and the like. The valve may be hand-operated.

The reduction gears 300 have the three-gear reduction mechanism in this embodiment. However, the reduction gears 300 may have at least one eccentric wobbling inscribed gear type of a planetary gear mechanism.

The series of valve drive units may have more than two importance categories, besides importance on the anti-counter-rotating function and importance on the rotational efficiency.

In the above embodiment, the third carrier 208 of the final reduction mechanism 360 is fixed, and the third internal gear 204 is coupled to a valve body 602 side (an output side). However, the third internal gear 204 may be fixed, and a portion corresponding to the inner pin 208a of the third carrier 208 may be coupled to the valve body 602 side (an output shaft 210 side). An eccentric element axis may be provided in a position corresponding to the inner pin of the external gear 206. Namely, an eccentric wobbling inscribed gear type of planetary gear mechanism in a division type may be employed.

According to the present invention, it is possible to supply the series of electric valve drive units which can set up the rotational efficiency and the anti-counter-rotating function of the valve body in accordance with a use application, with realizing miniaturization and space savings of the drive unit.

What is claimed is:

1. A valve drive unit for driving a valve having a valve body comprising:
   an input shaft;
   an external gear eccentrically and wobbly rotatable around the input shaft;
   an internal gear engaged with the external gear; and
   a carrier being able to absorb a wobbling ingredient of the external gear, wherein
   one of the internal gear and the carrier is able to be fixed and the other is able to be coupled to the valve body,
   as to eccentric wobbling rotational resistance of the external gear, two types of the valve drive units are prepared, one type of which has a first resistance against reverse torque from the valve body to the external gear, and the other type of which has a second resistance being smaller than the first resistance, said second resistance being against reverse torque from the valve body to the external gear, wherein one type of the valve drive units is selected.

2. The valve drive unit according to claim 1, wherein the valve drive unit has a sliding section between the external gear and another component, the type which has the first resistance has no sliding acceleration member, and the type which has the second resistance has a sliding acceleration member.

3. The valve drive unit according to claim 1, wherein the valve drive unit has a sliding section between the external gear and another component, a sliding acceleration member is disposed in the sliding section, and a sliding resistance of the sliding acceleration member of the type which has the first resistance is bigger than that of the sliding acceleration member of the type which has the second resistance.

4. The valve drive unit according to claim 1, wherein the valve drive unit has a sliding section between the external gear and another component, a sliding acceleration member is disposed in the sliding section, and a coefficient of friction of the sliding acceleration member of the type which has the first resistance is bigger than that of the sliding acceleration member of the type which has the second resistance.

5. The valve drive units according to claim 2, wherein the valve drive unit has an eccentric element to wobbly rotate the external gear, and the sliding section between the external gear and another component is the sliding section between the external gear and the eccentric element.

6. The valve drive units according to claim 2, wherein the carrier includes an inner pin fitted into an inner pinhole formed in the external gear with play for the sake of absorbing the wobbling ingredient of the external gear, and the sliding section between the external gear and another component is the sliding section between the inner pinhole formed in the external gear and the inner pin.

7. The valve drive units according to claim 2, wherein the valve drive unit has an eccentric element to wobbly rotate the external gear, the carrier includes an inner pin fitted into an inner pinhole formed in the external gear with play for the sake of absorbing the wobbling ingredient of the external gear, and the sliding section between the external gear and another component is the sliding section between the external gear and the eccentric element and is also the sliding section between the inner pinhole formed in the external gear and the inner pin.

8. A series of valve drive units for driving a valve body via reduction gears,
   each reduction gear comprising an eccentric wobbling inscribed gear type of planetary gear mechanism, as at least one of reduction mechanisms of the reduction gear, having an input shaft, an external gear eccentrically and wobbly rotatable around the input shaft, an internal gear engaged with the external gear, and a carrier being able to absorb a wobbling ingredient of the external gear, one of the internal gear and the carrier being able to be fixed and the other being able to be coupled to the valve body, wherein
   at least two types of the valve drive units are provided, one type of which has a first resistance against reverse torque from the valve body to the external gear, and the other type of which has a second resistance being smaller that the first resistance, said second resistance being against reverse torque from the valve body to the external gear, by means of making a difference in eccentric wobbling rotational resistance of the external gear.

9. The series of valve drive units according to claim 2, wherein components except for a component to make the difference in the eccentric wobbling rotational resistance of the external gear, are shared among the series of electric valve drive units.

10. A method for manufacturing a valve drive unit for driving a valve having a valve body comprising the steps of:

preparing a reduction mechanism having an input shaft, an external gear eccentrically and wobbly rotatable around the input shaft, an internal gear engaged with the external gear, a carrier being able to absorb a wobbling ingredient of the external gear;

enabling one of the internal gear and the carrier to be fixed and enabling the other one to be coupled to the valve body;

preparing two types of resistances as to eccentric wobbling rotational resistance of the external gear, one type of which has a first resistance against reverse torque from the valve body to the external gear, and the other type of which has a second resistance being smaller than the first resistance, said second resistance being against reverse torque from the valve body to the external gear; and selecting and adopting one type of the resistances.

* * * * *